(12) United States Patent
Schmidt et al.

(10) Patent No.: US 7,573,634 B2
(45) Date of Patent: Aug. 11, 2009

(54) MICROMECHANICAL MIRRORS WITH A HIGH-REFLECTION COATING, METHOD FOR PRODUCTION THEREOF AND USE THEREOF

(75) Inventors: Uwe Jan Schmidt, Dresden (DE); Thilo Sandner, Dresden (DE); Harald Schenk, Dresden (DE); Alexandre Gatto, Aalen (DE); Minghong Yang, Berlin (DE); Jörg Heber, Erfurt (DE); Norbert Kaiser, Jena (DE)

(73) Assignee: Fraunhofer-Gesellschaft Zür Förderung Der Angewandten Forschung E.V., München (DE)

( * ) Notice: Subject to any disclaimer, the term of this patent is extended or adjusted under 35 U.S.C. 154(b) by 218 days.

(21) Appl. No.: 11/630,175

(22) PCT Filed: Jun. 27, 2005

(86) PCT No.: PCT/EP2005/006901

§ 371 (c)(1),
(2), (4) Date: May 15, 2007

(87) PCT Pub. No.: WO2006/000445

PCT Pub. Date: Jan. 5, 2006

(65) Prior Publication Data

US 2008/0068704 A1      Mar. 20, 2008

(30) Foreign Application Priority Data

Jun. 25, 2004   (DE) ....................... 10 2004 030 803

(51) Int. Cl.
*G02B 5/08* (2006.01)

(52) U.S. Cl. .................................. 359/360; 359/224.1
(58) Field of Classification Search ...................... None
See application file for complete search history.

(56) References Cited

U.S. PATENT DOCUMENTS

| 4,408,825 A | 10/1983 | Stelmack |
| 5,214,344 A | 5/1993 | Kogelschatz |

(Continued)

FOREIGN PATENT DOCUMENTS

DE    19854803 A1    11/1998

(Continued)

OTHER PUBLICATIONS

Sandner et al., Highly reflective coatings for micromechanical mirror arrays operating in the DUV and VUV spectral ranges, Proceedings of the SPIE—The international Society for Optical Engineering, 2005, vol. 5721, No. 1, p. 72-80.*

(Continued)

*Primary Examiner*—Lee Fineman
(74) *Attorney, Agent, or Firm*—Matthew B. Dernier, Esq.; Gibson & Dernier LLP (57) ABSTRACT

The invention relates to micromechanical mirrors with a high-reflection coating for the deep-ultraviolet (DUV) and vacuum-ultraviolet (VUV) spectral range, based on a substrate which is coated with an aluminum layer and a transparent blooming coating. Likewise the invention relates to a method for the production of such micromechanical layers with a high-reflection coating and to the use thereof for the production of microsensors, optical data stores or video and data projection displays.

28 Claims, 5 Drawing Sheets

U.S. PATENT DOCUMENTS 5,619,059 A    4/1997    Li et al.
6,362,083 B1   3/2002    Mueller-Fiedler et al.
6,712,480 B1 * 3/2004    Leung et al. ................ 359/846

FOREIGN PATENT DOCUMENTS

WO    WO03/067304 A1    8/2003
WO    WO2004/084710 A2  10/2004

OTHER PUBLICATIONS

ISR of PCT/EP2005/006901.
"Jahresbericht Annual Report 2003" by Fraunhofer Institut Angewandte Optik und Feinmechanik, pp. 34-37 (2003).
"A comparative study of the UV optical and structural properties of Sio2, Al2O3, and Hfo2 single layers deposited by reactive evaporation, ion-assisted deposition and plasma ion-assisted deposition" by R. Theielsch, et al., Thin Solid Films, pp. 86-93 (2002), Germany.
"High damage threshold Al2O3/SiO2 dielectric coatings for excimer lasers" by N. Kaiser, et al., Thin Solid Films, pp. 36-92 (1995), Germany.
"High Performance deep-ultraviolet optics for free- electron lasers" by Alexandre Gatto, et al., Applied Optics /vol. 41, No. 16 /1, pp. 3236-3241 Jun. 2002.
"248 nm laser interaction studies on LaF3/MgF2 optical coatings by cross-sectional transmission electron microscopy" by Zs. Czigany et al., Thin Solid Films, pp. 176-181 (1997) Germany.
"Optical interference coatings" by N. Kaiser and H.K. Pulker., Optical Sciences, pp. 257-279.
Written Opinion of PCT/EP2005/006901.
International Preliminary Report on Patentability of PCT/EP2005/006901.
"New Laser Pattern Generator for DUV Using a Spatial Light Modulator," by Ulric Ljungblad et al., Microelectronic Engineering 57-58 (2001) 23-29, 2001 Elsevier Science B.V.
"Reliability Test and Failure Analysis of Optical MEMS," by P. Durr et al., Proceedings of 9th IPFA 2002, Singapore, pp. 201-206.
"New Architecture for Laser Pattern Generators for 130 nm and Beyond," by Ulric Ljungblad et al., Proceedings of SPIE vol. 4186 (2001), pp. 16-21.
"Micromirror SLM for Femtosecond Pulse Shaping in the Ultraviolet," by M. Hacker et al., Applied Physics B—Lasers and Optics, Appl. Phys. B 76, 711-714 (2003).
"Fraunhofer Institut fur Angewandte Optik und Feinmechanik" Annual Report 2003.
"Vacuum Ultraviolet Loss in Magnesium Fluoride Films," by Obert R. Wood II et al., Applied Optics / vol. 23, No. 20 / Oct. 15, 1984.

* cited by examiner

FIG. 1

Hinges    Actuated Mirror

Address Electrode

MICROMECHANICAL MIRRORS WITH A HIGH-REFLECTION COATING, METHOD FOR PRODUCTION THEREOF AND USE THEREOF

BACKGROUND

The invention relates to micromechanical mirrors with a high-reflection coating for the deep-ultraviolet (DUV) and vacuum-ultraviolet (VUV) spectral range, based on a substrate, a highly reflective aluminium layer, at least one transparent blooming coating and at least one compensation layer for stress compensation. The invention likewise relates to a method for the production of such micromechanical mirrors with a high-reflection coating and also to the use thereof inter alia for the production of microsensors, optical data stores or video and data projection displays.

The production, modulation, conduction and detection of light presently occupy the central position in the field of optics research. The constant increase in modulation speeds and the trend towards higher integration densities are forcing miniaturisation of microoptic components and have led to the development of functional layers based on nanostructures for active optical components. The synergy of optoelectronics and micromechanics has led to a new class of integrated microoptoelectromechanical systems (MOEMS) with completely new fields of application and great potential for the near future. Examples of MOEMS applications are phase front corrections by adaptive optics, lab-on-chip and also telecommunications applications.

A completely new application which forms the background to this invention is UV lithography by means of spatial light modulators SLM, in which the productivity of conventional optical lithography and the high-resolution properties of electron beam lithography are combined (U. Ljungblad, U. Dauderstädt, P. Dürr, T. Sandström, H. Buhre, H. Lakner, "New laser pattern generator for DUV using spatial light modulator", Microelectronic Engineering 57-58 (2001)23-29; T. Sandström, U. B. Ljungblad, P. Dürr, H. Lakner "High-performance laser pattern generation using spatial light modulators (SLM) and deep-UV radiation, Proceedings of SPIE Vol. 4343 (2001) 35; R. Thielsch, "Optical coatings for the DUV/VUV", in Interference Coatings, by N. Kaiser and H. K. Pulker (Editors), Springer Series in Optical Sciences, Volume 88 (2003)). Applications of this technology are mask exposers for the production of photomasks for semiconductor technology or direct illumination systems for mask-free lithography which, relative to existing laser or electron-beam-based illumination systems, are significantly more economical and rapid. These systems operate in the DUV or VUV spectral range where, because of the strong absorption of most materials, beam damage plays an important role. The reduction in the absorption of reflecting microactuators, so-called micromirrors, or the achievement of high reflectances in the DUV/VUV (>90%) is therefore demanded urgently not only for reducing light losses but above all also for preventing degradation effects on micromirrors.

Although the technology of solid mirrors for the DUV/VUV range is extensively known, to date there are no optical silverings for micromirrors in the DUV/VUV which meet these requirements. The reason for this is the band conditions which in comparison with solid mirrors are more complex by a multiple and which silvering which is compatible with the technology of MOEMS must meet.

There are two fundamentally different concepts for the production of silvering: 1. dielectrical Bragg mirrors, i.e. stacks of layers with high or low reflective index; and 2. metallic mirrors.

In the literature, there have been presented specially for the DUV/VUV range, both Bragg mirrors (Zs. Czigany, M. Adamik, N. Kaiser, "248 nm laser interaction studies on LaF3/MgF2 optical coatings by cross-sectional transmission electron microscopy", Thin Solid Films 312 (1998) 176-181; A. Gatto, J. Heber, N. Kaiser, D. Ristau, S. Günster, J. Kohlhaas, N. Marsi, M. Trovo, R. P. Walker, "High-performance DUV/VUV optics for the Storage Ring FEL at ELETTRA", Nuclear Instruments and Methods in Physics Research A 483 (2002)357-362; N. Kaiser, H. K. Pulker (Editors), Optical Interference Coatings (Springer Series in Optical Sciences, 88), Springer-Press, Berlin, Heidelberg, N.Y., 2003) and Silvered Aluminium Mirrors. Integrated micromirror arrays with non-bloomed aluminium mirrors exist for applications in the visible spectral range (VIS) which are used in projection displays. Micromirror arrays for applications in UV (inter alia mask-free lithography at 248 nm) are manufactured by the Fraunhofer Institute for Photonic Microsystems, Dresden. A non-bloomed aluminium alloy is used here as material. Only a few works are involved with bloomed silverings for micromechanical actuators. The existing works are thereby restricted to the visible spectral range (400-800 nm). To date no works are known for bloomed micromirrors for the DUV/VUV.

The application of reflecting microactuators in the DUV and VUV (140-400 nm) requires coating thereof with high-reflection layer systems in order, on the one hand, to minimise the intensity loss by absorption and scattering and, on the other hand, to avoid the introduction of power into the actuator material and consequently caused structural instabilities, such as e.g. distortion of unsupported structures, but also oxidation or corrosion of the actuator materials. In contrast to the solid large-surface high-reflection (HR) mirrors, mirror layers on unsupported microactuators must meet additional requirements: the HR silvering must be able to be structured with methods of semiconductor technology, their reflectance not being permitted to be reduced by application of these methods. In order to ensure the flatness of the microactuators within a temperature interval around the operating point, the silvered actuators constructed in general from two and more layers must be compensated for with respect to layer tensions and thermal expansion.

SUMMARY OF THE INVENTION

Starting herefrom, it was the object of the present invention to provide planar micromechanical mirrors which have structurable high-reflection coatings in the spectral range of DUV and VUV.

According to the invention, a micromechanical mirror with a high-reflection coating for the deep-ultraviolet (DUV) and vacuum-ultraviolet (VUV) spectral range having a substrate and aluminium layer which is deposited thereon and is covered with at least one transparent blooming coating is provided. The blooming coating thereby has a plurality of functions. On the one hand, it protects the aluminium layer from oxidation and corrosion, on the other hand, it increases the reflectance in the sought wavelength range.

As a further feature, the mirror has at least one compensation layer for stress compensation. Bloomed aluminium mirrors can be deposited with suitable choice of deposition parameters with very low layer tensions on various sub-layers. In common with the required low layer thicknesses of the silvering, this has the effect that stress compensation of the blooming can be achieved by the at least one additional compensation layer. Hence high planarity is made possible even for very thin micromirrors with a thickness <1 µm. The separation between actuator material, i.e. substrate, and silvering enables in addition separate optimisation of the functional properties of both components.

The mirror according to the invention has a reflectance R of at least 70%, high planarity D, i.e. the central deviation of the mirror surface from a compensation plane, being produced at the same time of at most $\lambda/4$.

There should be understood by substrate within the scope of the present invention also a carrier layer. This can be disposed within the mirror existing on a layer stack at any position within the layer stack.

In comparison with the alternatively applicable dielectric layer systems, bloomed aluminium silverings have several advantages with respect to the technology of micromirrors. The optimal reflectance for the respective wavelength is already achieved with a relatively small total thickness of the silvering, i.e. approx. 100 to 150 nm in the spectral range of 140 to 400 nm, which makes structuring only possible at all in the case of silverings which are difficult to etch and is desirable in particular for the production of narrow structures in the range of <1 µm.

Preferably the mirror is constructed symmetrically with respect to the thickness of the mechanical and/or thermal properties of substrate and individual layers. The mechanical and thermal properties hereby concern in particular the layer tension, the modulus of elasticity and the coefficient of expansion.

In the case of a symmetrical construction of the mirror, the change in deformation with temperature is very small. Thus it can be preferably below a value of $\lambda/4$ per 10 Kelvin.

Mirrors, in which the blooming coating assumes at the same time the function of the compensation layer, and which hence deviate from the symmetrical design, are examples of basically likewise provided asymmetrical constructions.

In a further preferred embodiment, the tensions of substrate and the individual layers differ only slightly. This is achieved in that the tensions of the individual layers are adjusted such that the changes in deformation during a process-related variation in thickness or another parameter of one or more layers is minimised. For particular preference, the tension of substrate and the individual layers differs by maximum 200 MPa.

The mirror according to the invention preferably has a central tension which, in the case of lateral anchoring of the mirror by rotational or tilting hinges, precludes spontaneous deformation (so-called buckling). For particular preference, the mirror is therefore braced with tension in the centre, i.e. it has tensile stress.

There are fundamentally no restrictions with respect to the substrate to be used. Preferably the substrate comprises a material such that the mechanical tension for the layer thicknesses which are relevant for the substrate is independent of the layer thickness. There are thereby possible as material for the substrate both monocrystalline, polycrystalline, nanocrystalline or amorphous materials. There should be mentioned here as preferred materials in particular silicon and/or aluminium.

In a preferred variant, the substrate or at least one concentration layer comprises a mixed layer comprising $Si_xAl_yO_zN_{(1-x-y-z)}$ with $1 \geq z \geq 0$, $1 \geq y \geq 0$, $1 \geq x \geq 0.05$ and $1 \geq x+y \geq 0.7$.

Another variant provides a substrate or at least one compensation layer comprising a mixed layer comprising $Ti_xAl_yO_zN_{(1-x-y-z)}$ with $1 \geq z \geq 0$, $1 \geq y \geq 0$, $1 \geq x \geq 0.05$ and $1 \geq x+y \geq 0.7$. This also includes a layer made of TiN.

Preferably the substrate or at least one compensation layer comprises a mixed layer comprising $Ta_xSi_yO_zN_{(1-x-y-z)}$ with $1 \geq z \geq 0$, $1 \geq y \geq 0.05$, $1 \geq x \geq 0.05$ and $1 \geq x+y \geq 0.7$, a layer made of TaN also being possible.

Another preferred embodiment provides a substrate or at least one compensation layer comprising $Mo_xSi_yO_zN_{(1-x-y-z)}$ with $1 \geq z \geq 0$, $1 \geq y \geq 0$, $1 \geq x \geq 0.05$ and $1 \geq x+y \geq 0.7$, a layer made of MoN also being possible.

In addition, it is preferred that the substrate contains at least one compensation layer comprising a mixed layer comprising $Co_xSi_yO_zN_{(1-x-y-z)}$ with $1 \geq y \geq 0$, $1 \geq x \geq 0.05$, $1 \geq x+y \geq 0.7$ and $0.3 \geq z \geq 0$.

Preferably the micromechanical mirror according to the invention is highly reflective in the spectral range of 140 to 400 nm. The micromechanical mirror shows however also excellent results in the spectral range of 400 to 2,000 nm because of its high reflectance.

In a preferred embodiment, the aluminium layer has a layer thickness of 10 to 1,000 nm, in particular of 50 to 200 nm and particularly preferred of 50 to 100 nm.

The blooming coating is preferably a fluoride layer, an oxide layer and/or mixed layers thereof. There are preferred as fluoride layers in particular layers made of magnesium fluoride ($MgF_2$), yttrium fluoride ($YF_3$), lanthanum fluoride ($LaF_3$), aluminium fluoride ($AlF_3$), neodymium fluoride ($NdF_3$), barium fluoride ($BaF_2$), chiolite, dysprosium fluoride ($DyF_3$), gadolinium fluoride ($GdF_2$), cryolite, lithium fluoride (LiF), sodium fluoride (NaF), lutecium fluoride ($LuF_3$), samarium fluoride ($SmF_3$), strontium fluoride ($SrF_2$), terbium fluoride ($TbF_3$), ytterbium fluoride ($YbF_3$), zirconium fluoride ($ZrF_4$) or mixtures of these materials. There are preferred as oxides aluminium oxide ($Al_2O_3$), silicon oxide ($SiO_2$), tantalum oxide ($Ta_2O_5$) niobium oxide ($Nb_2O_5$), hafnium oxide ($HfO_2$), titanium oxide ($TiO_2$), magnesium oxide (MgO) or mixtures of these materials. Mixtures of the materials of the oxides and fluorides can also hereby be present. Blooming coatings of this type form a protection against the oxidation of the aluminium layer in air and thus reduce the rapid degradation of reflectance in the DUV/VUV which is known from unprotected aluminium mirrors.

Preferably the blooming coatings have a layer thickness in the range of 10 to 200 nm, particularly preferred in the range of 20 to 100 nm and particularly preferred of 30 to 60 nm. The compensation layers can include materials, such as for example, germanium, tantalum, titanium or thorium fluoride, or other suitable materials.

In addition, it is preferred that a further layer made of gold and/or silver is disposed on the aluminium layer, i.e. between aluminium layer and blooming coating, as a result of which high reflectance can be achieved even in different wavelength ranges, in particular in the visible range.

Preferably the aluminium layer, the at least one blooming coating and the at least one compensation layer can be structured lithographically.

According to the invention, likewise a method for the production of micromechanical mirrors with a high-reflection coating is provided, in which a substrate is coated in a high vacuum evaporation chamber with aluminium, at least one compensation layer and at least one blooming coating made of a fluoride, oxide or mixtures thereof. The precise arrangement of the individual layers in the layer stack is thereby arbitrary. The deposition of the blooming coating is thereby effected at a low substrate temperature, i.e. <100° C., directly after deposition of the aluminium layer in the same vacuum cycle.

Fundamentally both physical deposition methods, e.g. sputter deposition, thermal evaporation or chemical deposition methods, e.g. wet chemical techniques, CVD or ALD, are suitable for the deposition.

The micromechanical mirrors with the high-reflection coating according to the invention are used in the production of microsensors, optical data stores and video and data projection displays. Further application possibilities are in the field of lab-on-chip applications or telecommunications applications.

Further application possibilities of the micromechanical mirror relate to the use in a spatial light modulator (SLM) mirror array. SLM mirror arrays of this type can be used for example for the exposure of masks or wafers in semiconductor lithography, as dispersive element in the formation of laser pulses, in the surveying of three-dimensional objects by strip projection methods, for deflection and modification of laser beams, in opthalmology and also as phase-modulating element in the correction of imaging errors in an optical system.

BRIEF DESCRIPTION OF THE DRAWING

The subject according to the invention is intended to be explained in more detail with reference to the subsequent Figures and the following example, without limiting the latter to the special embodiments shown here.

DETAILED DESCRIPTION OF THE PRESENT INVENTION

Figure 1:
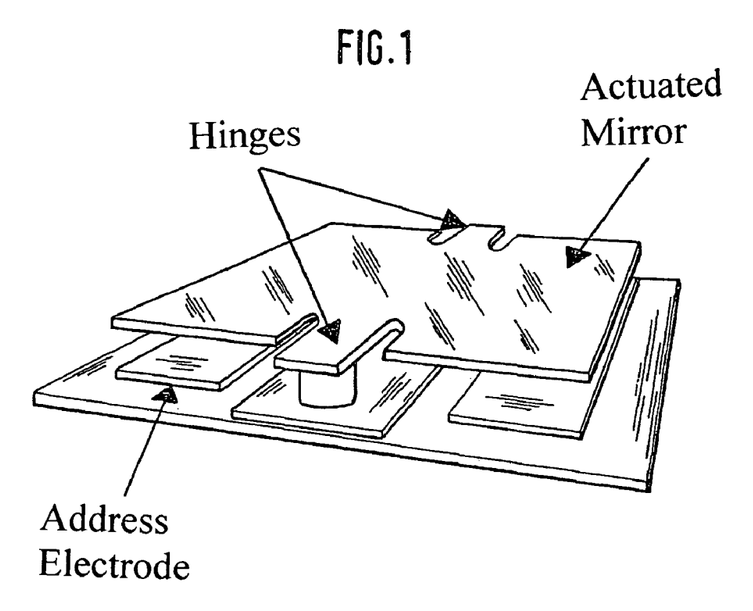
FIG. 1 shows a schematic representation of a micromechanical mirror according to the invention.
Figure 2:
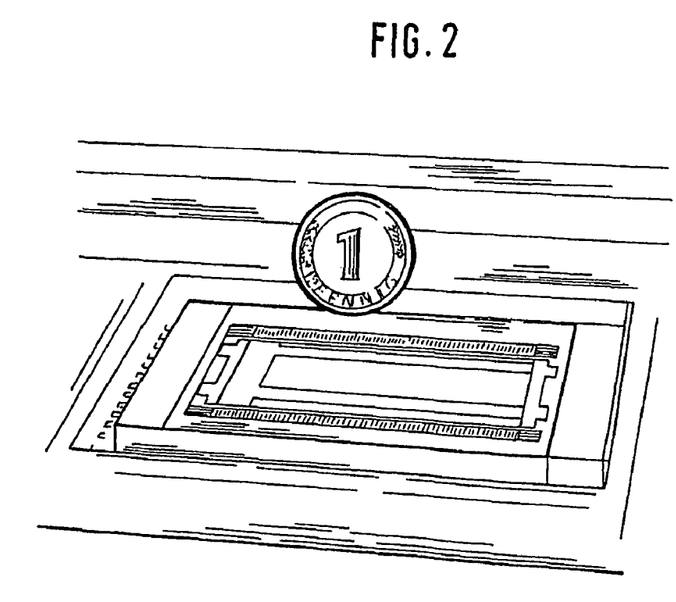
FIG. 2 shows an image of an integrated spatial light modulator.
Figure 3:
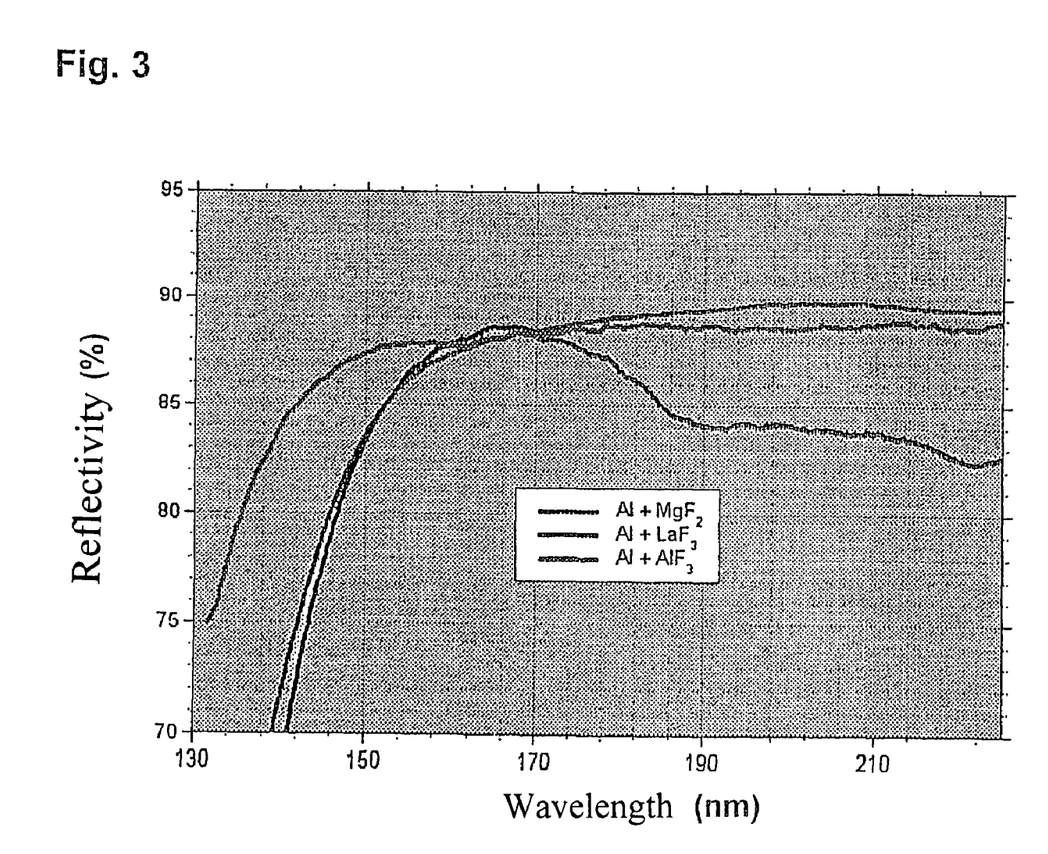
FIG. 3 shows a reflection spectrum of an aluminium silvering according to the invention with fluoride blooming coating.
Figure 4:
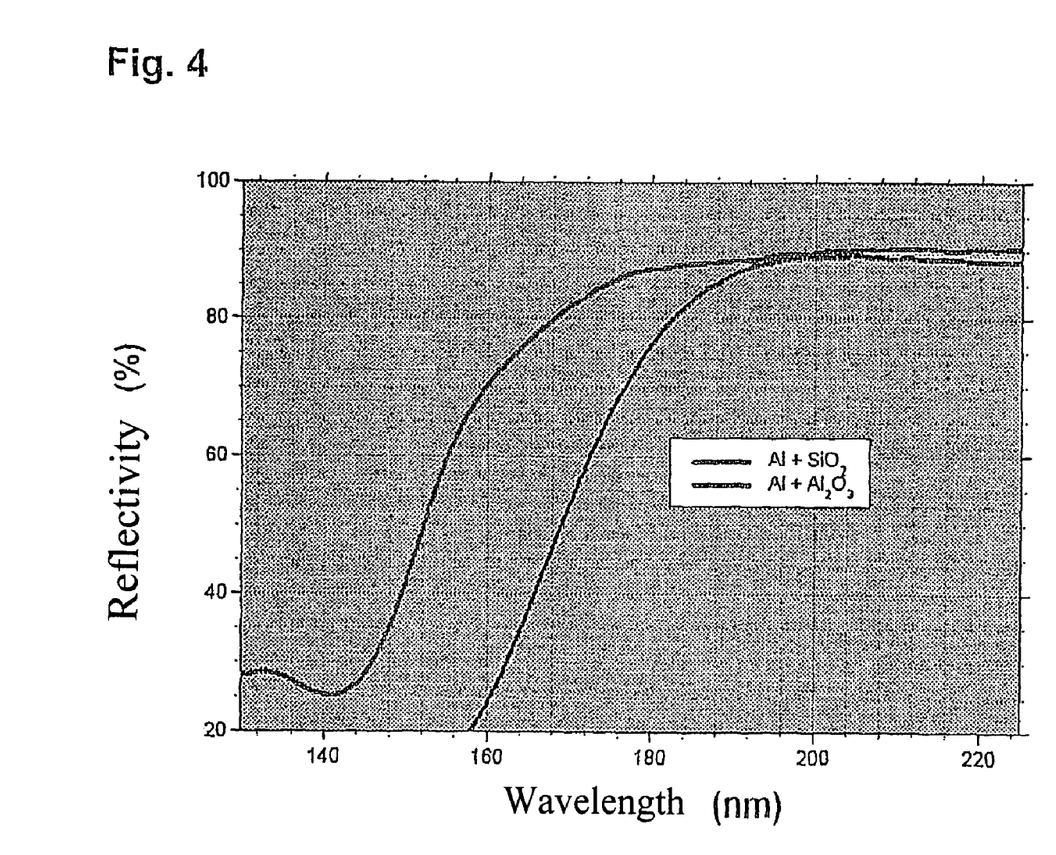
FIG. 4 shows a reflection spectrum of an aluminium silvering according to the invention with an oxide blooming coating.
Figure 5:
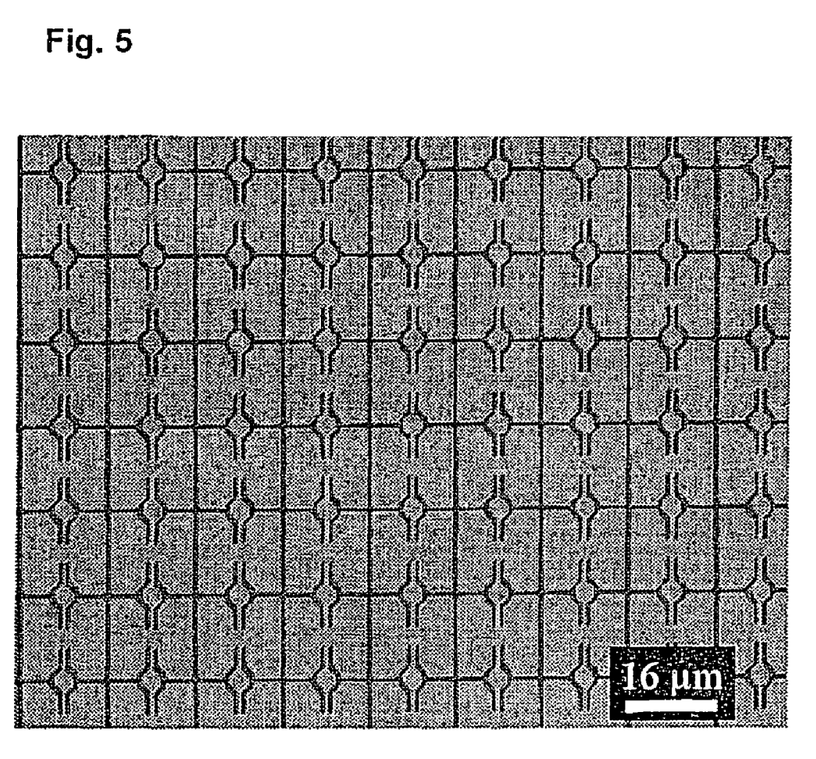
FIG. 5 shows a silvering according to the invention which comprises an aluminium layer with a layer thickness of 90 nm and an oxide blooming coating comprising $Al_2O_3$ with a layer thickness of 38 nm.
Figure 6:
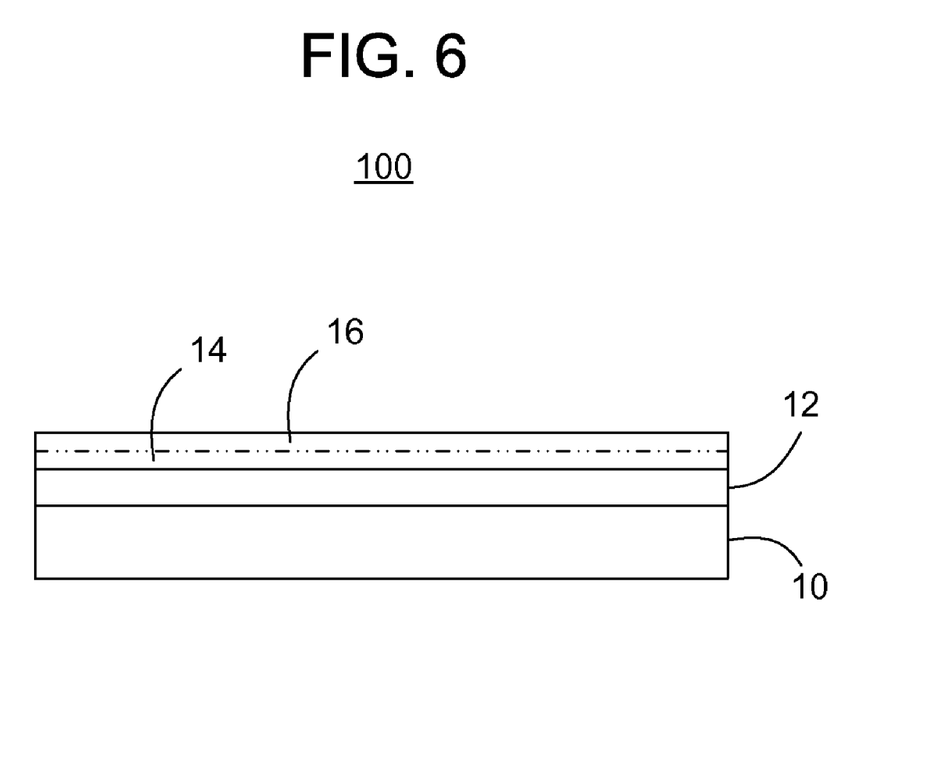
FIG. 6 shows a particular structural schematic representation of a micromechanical mirror according to one or more embodiments of the invention.

Reference is now made to FIGS. 1-6 in which the following example of one or more embodiments of the invention will be described. According to the invention, a micromechanical mirror 100 includes: substrate 10, an aluminium layer 12 deposited on the substrate 10, at least one transparent blooming coating 14 disposed on the aluminium layer 12, and at least one compensation layer 16 for stress compensation (which may be a separate layer or integrally part of the blooming coating 14). For application in a worldwide new generation of UV mask exposers, there were integrated at the Fraunhofer Institute for Photonic Microsystems (IPMS) in Dresden, square, 16 µm wide micromirrors, which can be tilted about the central axis, in SLM micromirror arrays (e.g. 1,024×512 mirrors). Each individual mirror is able hereby to be deflected individually via a scattering electrode. In the mask-free lithography units of the Swedish company Micronic, SLM arrays are a component of the projection optics and operate as programmable optical 2D grating at wavelengths of 248 nm or 193 nm. At the Fraunhofer Institute for Precision Optics and Precision Mechanics Jena (IOF), bloomed aluminium silverings have been developed specially for wavelengths of 193 nm and 157 nm. The HR silverings were produced in a high vacuum evaporation chamber of the company Balzers (type BAK640, equipped with cryopump, electron beam and thermal evaporator, basic pressure $6 \cdot 10^{-7}$ mbar). The silvering layers comprised a 75 nm thick aluminium layer (deposited on silicon at a rate of 30 nm/s) and different dielectric bloomings which were deposited at a rate of 1 nm/s at the respectively optimum thickness. The maximum reflectances achieved were hereby 91.2% for 193 nm or 88.9% for 157 nm. FIG. 3 and FIG. 4 show the experimental reflection spectra of the silverings specified in Table 1, with the different fluoride or oxide blooming coatings.

TABLE 1

| $\lambda_0$ (nm) | Material Design | Substrate | Aluminium Thickness (nm) | Blooming Thickness (nm) | R (%) at 0° 193 nm | $\lambda_0$ of 157 nm |
|---|---|---|---|---|---|---|
| 193 | Al | Si | 75 | — | 87 | 73 |
| 193 | $Al/SiO_2$ | Si | 90 | 50 | 89 | 83 |
| 193 | $Al/Al_2O_3$ | Si | 90 | 38 | 88 | — |
| 157 | $Al/MgF_2$ | Si | 90 | 44 | 91 | 88 |
| 157 | $Al/LaF_3$ | Si | 90 | 33 | 85 | 88 |
| 157 | $Al/AlF_3$ | Si | 90 | 55 | 91 | 89 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A micromechanical mirror with a high-reflection coating for deep-ultraviolet (DUV) and vacuum-ultraviolet (VUV) spectral ranges, comprising:
    a substrate;
    an aluminium layer deposited on the substrate;
    at least one transparent blooming coating covering the aluminum layer, the blooming coating comprising a fluoride layer, an oxide layer and/or mixed layers thereof; and
    at least one compensation layer for stress compensation selected from the group consisting of mixed oxides, $Si_xAl_yO_zN_{(1-x-y-z)}$ with $1>x>0.05$, $1>y>0$, $1>z>0$ and $1>x+y>0.7$, $Ti_xAl_yO_zN_{(1-x-y-z)}$ with $1>x>0.05$, $1>y>0$, $1>z>0$ and $1>x+y>0.7$, $Ta_xSi_yO_zN_{(1-x-y-z)}$ with $1>x>0.05$, $1>y>0$, $1>z>0$ and $1>x+y>0.7$, $Mo_xSi_yO_zN_{(1-x-y-z)}$ with $1>x>0.05$, $1>y>0$, $1>z>0$ and $1>x+y>0.7$ and $Co_xSi_yO_zN_{(1-x-y-z)}$ with $1>x>0$, $1>y>0$, $0.3>z>0$ and $1>x+y>0.7$,
    wherein the mirror has a high reflectance R of at least 70% at a wavelength in the DUV and VUV spectral ranges with simultaneously high planarity D of maximum $\lambda/4$.

2. The micromechanical mirror according to claim 1, wherein the mirror is configured symmetrically with respect to a thickness of, and mechanical and thermal properties of the substrate and the layers.

3. The micromechanical mirror according to claim 1, wherein the mirror is configured asymmetrically with respect to at least one of: features, a thickness, and mechanical and thermal properties, of the substrate and the layers.

4. The micromechanical mirror according to claim 1, wherein the blooming coating simultaneously provides the function of the compensation layer.

5. The micromechanical mirror according to claim 1, wherein a change in deformation of the mirror with temperature is a maximum of $\lambda/4$ per 10 Kelvin.

6. The micromechanical mirror according to claim 1, wherein a tension of the substrate and the layers differs by a maximum of 200 MPa.

7. The micromechanical mirror according to claim 1, wherein a central tension of the mirror is in a range which, in the case of lateral anchoring of the mirror by rotational or tilting hinges, precludes spontaneous deformation.

8. The micromechanical mirror according to claim 1, wherein the mirror is braced with tension in a centre thereof.

9. The micromechanical mirror according to claim 1, wherein the substrate comprises a material, having a mechanical tension of that is independent of a layer thickness of the material.

10. The micromechanical mirror according to claim 9, wherein the substrate comprises a monocrystalline, polycrystalline, nanocrystalline or amorphous material.

11. The micromechanical mirror according to claim 1, wherein the micromechanical mirror is highly reflective in a spectral range of 140 to 400 nm.

12. The micromechanical mirror according to claim 1, wherein the micromechanical mirror is highly reflective in a spectral range of 400 to 2,000 nm.

13. The micromechanical mirror according to claim 1, wherein the aluminium layer has a layer thickness of one of: 10 to 1,000 nm, and 50 to 200 nm.

14. The micromechanical mirror according to claim 1, wherein the blooming coating comprises a fluoride layer, an oxide layer and/or mixed layers thereof.

15. The micromechanical mirror according to claim 1, wherein the at least one blooming coating comprises a material selected from the group consisting of: fluorides $MgF_2$, $YF_3$, $LaF_3$, $AlF_3$, $NdF_3$, $BaF_2$, chiolite, $DyF_3$, $GdF_3$, cryolite, $LiF$, $NaF$, $LuF_3$, $SmF_3$, $SrF_2$, $TbF_3$, $YbF_3$, $ZrF_4$, the oxides $Al_2O_3$, $SiO_2$, $Ta_2O_5$, $Nb_2O_5$, $\geq HfO_2$, $TiO_2$, $MgO$ or mixtures of these materials.

16. The micromechanical mirror according to claim 1, wherein the blooming coating has a layer thickness of one of: 10 to 200 nm, and 20 to 100 nm.

17. The micromechanical mirror according to claim 1, wherein a further layer made of gold and/or silver is disposed between the aluminium layer and the blooming coating.

18. The micromechanical mirror according to claim 1, wherein the aluminium layer, the at least one blooming coating and the at least one compensation layer are formed using lithographically.

19. A method for the production of micromechanical mirrors with a high-reflection coating according to claim 1, the micromechanical mirrors comprising:
   (i) a substrate;
   (ii) an aluminium layer deposited on the substrate;
   (iii) at least one transparent blooming coating covering the aluminum layer, the blooming coating comprising a fluoride layer, an oxide layer and/or mixed layers thereof; and
   (iv) at least one compensation layer for stress compensation selected from the group consisting of mixed oxides, $Si_xAl_yO_zN_{(1-x-y-z)}$ with $1>x>0.05$, $1>y>0$, $1>z>0$ and $1>x+y>0.7$, $Ti_xAl_yO_zN_{(1-x-y-z)}$ with $1>x>0.05$, $1>y>0$, $1>z>0$ and $1>x+y>0.7$, $Ta_xSi_yO_zN_{(1-x-y-z)}$ with $1>x>0.05$, $1>y>0$, $1>z>0$ and $1>x+y>0.7$, $Mo_xSi_yO_zN_{(1-x-y-z)}$ with $1>x>0.05$, $1>y>0$, $1>z>0$ and $1>x+y>0.7$ and $Co_xSi_yO_zN_{(1-x-y-z)}$ with $1>x>0$, $1>y>0$, $0.3>z>0$ and $1>x+y>0.7$, wherein the mirror has a high reflectance R of at least 70% at a wavelength in the DUV and VUV spectral ranges with simultaneously high planarity D of maximum $\lambda/4$, the method comprising producing a layer stack forming the substrate, the aluminium layer, the at least one compensation layer, and the at least one blooming coating of the mirror entirely or partly by means of high vacuum evaporation, diode or magnetron sputtering, ion beam sputtering, atomic layer deposition, CVD or electroplating.

20. The method of claim 19, comprising disposing the micromechanical mirrors with a high-reflection coating in an apparatus for ophthalmology.

21. The method of claim 19, comprising disposing the micromechanical mirrors with a high-reflection coating in a lab-on-chip and/or telecommunications apparatus.

22. The method of claim 19, comprising disposing the micromechanical mirrors with a high-reflection coating in an apparatus for the production of microsensors, optical data stores and/or video and data projection displays.

23. The method of claim 19, comprising disposing the micromechanical mirrors with a high-reflection coating in a spatial light modulator (SLM) mirror array.

24. The method of claim 23, comprising disposing the SLM mirror array in an apparatus for the exposure of masks or wafers in semiconductor lithography.

25. The method of claim 23, comprising disposing the SLM mirror array in a dispersive element in the formation of laser pulses.

26. The method of claim 23, comprising disposing the SLM mirror array in an apparatus for the surveyance of three-dimensional objects by strip projection methods.

27. The method of claim 23, comprising disposing the SLM mirror array in an apparatus for the deflection and modification of laser beams in ophthalmology.

28. The method of claim 23, comprising disposing the SLM mirror array in a phase-modulating element in the correction of imaging errors in optical systems.

* * * * *